United States Patent [19]

Chevalier et al.

[11] Patent Number: 4,466,584
[45] Date of Patent: Aug. 21, 1984

[54] APPARATUS FOR COUNTING AND LIMITING THE NUMBER OF PLAYS OF A CASSETTE

[75] Inventors: Louis Chevalier, Cagnes sur Mer; Jean Coudert, Nice, both of France

[73] Assignee: Check View System S.A., Geneva, Switzerland

[21] Appl. No.: 330,516

[22] Filed: Dec. 14, 1981

[30] Foreign Application Priority Data

Dec. 12, 1980 [FR] France ............................... 80 26625
Nov. 24, 1981 [FR] France ............................... 81 22204

[51] Int. Cl.³ ..................... G11B 23/04; G11B 27/20; G01D 21/00
[52] U.S. Cl. ................................. 242/199; 33/172 F; 360/132
[58] Field of Search ............... 242/194, 197, 198, 199, 242/200, 201; 33/172 F; 360/132, 137

[56] References Cited

U.S. PATENT DOCUMENTS

| | | | |
|---|---|---|---|
| 2,612,565 | 9/1952 | Heller | 242/918 |
| 3,601,557 | 8/1971 | Lennox . | |
| 3,630,170 | 12/1971 | Christo | 360/132 X |
| 3,678,215 | 7/1972 | Kihara | 360/132 X |
| 3,761,643 | 9/1973 | Keeler . | |
| 3,995,319 | 11/1976 | Harris | 360/132 X |

FOREIGN PATENT DOCUMENTS

| | | |
|---|---|---|
| 2709142 | 9/1978 | Fed. Rep. of Germany ...... 242/199 |
| 2066235 | 8/1971 | France . |
| 2129050 | 10/1972 | France . |
| 2296907 | 7/1976 | France . |
| 2051480 | 4/1981 | France . |
| 1490062 | 10/1977 | United Kingdom . |

Primary Examiner—Stuart S. Levy
Assistant Examiner—Lloyd D. Doigan
Attorney, Agent, or Firm—Young & Thompson

[57] ABSTRACT

A cassette for a strip such as a tape or film, having a pair of spools between which the strip is wound and unwound, is provided with apparatus for counting and limiting the number of times the cassette is played. A feeler assembly is mounted for swinging movement on the cassette cover, between the rolls of strip on the spools, and has two feelers one of which rides on the outer periphery of one roll and the other of which rides on the outer periphery of the other roll. Upon winding and rewinding of the strip, therefore, the feeler assembly oscillates, and in doing so, it actuates an escapement which turns a toothed wheel. The toothed wheel, turning one unit of angular movement with each play of the cassette, records the number of plays by the rotated position of the wheel, which can be read through a window of the cassette, in the form of numerals on the wheel. Two wheels can be provided, one to count the number of plays, and the other bearing at least one abutment which stops the rotation of that other wheel, either by engagement with a fixed abutment on the cassette cover, or else by engaging and hence blocking the escapement in contact with an abutment surface on the wheel. The escapement can be so formed as to register the play only during a midportion thereof, thereby to prevent fraudulent extra use of the cassette by skipping the beginning or end of the strip.

7 Claims, 12 Drawing Figures

APPARATUS FOR COUNTING AND LIMITING THE NUMBER OF PLAYS OF A CASSETTE

The present invention relates to apparatus for counting and limiting the number of plays in the use of a cassette for tapes or film supports for sound and/or pictures or all other signals.

At present, the widespread use of recording and reproduction devices for cassettes permits the unauthorized copying of musical works, films, videotaped songs, etc., by duplication and reproduction of cassettes sold commercially, onto blank cassettes. The infringers who re-record cassettes or videotapes are completely unauthorized by the distributors and of course by the composers of the registered work. These cassette copies thus create a great problem for vendors, performers and composers.

The object of the present invention is to overcome these drawbacks. To achieve this object, a counter inaccessible to the user permits determining the number of times the cassette has been played. The renter may thus collect for the rented cassette, according to the number of plays. The renter may also see if the user has played his cassette more than a certain number of times and if, as a result, he is copying rented cassettes. The renter can also determine whether the rented cassette must be taken out of rental after a predetermined number of plays, after which the cassette is considered mechanically used up. The renter may thus report infringement to the parties charged with protection of the rights of the composer.

To this end, the apparatus according to the invention, adaptable to no matter what existing commercial cassette, permits counting the number of plays of the cassette. The apparatus according to the invention comprises at least one feeler means which reacts to variation of the thickness of the rolls of videotape or sound tape, which roll is comprised by rolled up turns of tape or film on the reel. Said feeler may be mounted on a swingable member which acts when the tape or strip of one of the rolls is completely exhausted to turn a counter which indicates and records the number of plays. The feeler may also, when one of the rolls of tape is completely unrolled, act on the counter by a half notch and when the roll is again wound up, act again through one half notch on the counter indicating thereby that the play of the cassette is finished. On one column is disposed a cam connected to two swinging members. Each swinging member has at its end a feeler. Said feeler consists of a roller of contacter which slides or which rolls on the top or periphery or the roll of tape and which actuates by its displacement a cam, which cam in its turn causes a balancer to swing which advances by one notch or by a half notch a toothed wheel which displays through a window in the cassette cover the numeral corresponding to the number of plays. The feeler moves as a function of the thickness of the roll formed by the winding or unwinding of the tape on the spool. The assembly of this apparatus is very flat, so as to be mountable in various related forms, on any commercially available cassette. This apparatus for counting the number of plays is not limited to cassettes as such, but may also be applied to cartridges, films, spools or tapes of no matter what type, all of which are referred to hereinafter by the common term "cassette". Such recording supports may, of course, be used for all kinds of record playing, for signalling of all kinds, for pictures, or for sound or the transmission of all other information.

The apparatus according to the present invention, can be used with all types of cassettes. It suffices to modify slightly the support columns of the guard plate of the casing of the cassette as well as the axial spacing of said columns, and to modify also the spacing of the notched wheel from the cam, as well as the length of the swinging arms.

Another embodiment according to the invention permits providing a seat, for the device or devices, integral with the bottom of the casing of the cassette. The apparatus according to the first embodiment is susceptible to fraudulent operation. Thus a knowledgeable user may stop the unwinding of the cassette a little before the end of the tape so as to avoid turning the counter and registering the playing of a complete reel. According to the first embodiment, the advancement of a half notch of the wheel takes place at the end of winding or unwinding of the strip from the roll. So as to prevent fraud by a knowledgeable user, who had observed the beginning of advance of the counter and who could thus use the cassette while omitting a little of the beginning and a little of the end of the tape, the time of advancing the notched wheel is modified. The relative dimensions of the different elements of the counter are modified so that the advance of the counter takes place for example in the middle of unwinding of the strip, the mechanical modifications tending to neutralize about 1/6th of the distance from the beginning and from the end of the reel.

Another improvement according to the invention permits, with or without the counting apparatus, determining a number of plays beyond which there will be a locking of the cassette against further plays. This apparatus for simplicity is called, in the description that follows, the cassette limitation. This cassette limitation permits for example to rent cassettes and to require the users to pay according to the number of plays. It also permits paying the royalties as a function of the number of reproductions of the works.

Finally, from a standpoint of technical quality, a cassette may be designated for X number of plays, for moe than which it cannot be used. This permits guaranteeing the users a minimum technical quality of reproduction of the works. The cassette limiting apparatus of the present invention comprises a wheel which is notched only on a portion of its periphery, the unnotched portion comprising a stop abutment.

In the case in which the cassette limitation can be unlocked and in which the cassette may be programmed for X number of additional plays, the wheel comprises, on its unnotched portion, a resetting abutment. Access means permits reaching said reset abutment thereby to maneuver said reset abutment. The access means may be a tube whose opening may be lockable by means of an electronic or magnetic key. Through this tube, pin means permits resetting the limitation counter to zero by pressing on the reset abutment, and the notched wheel turns in the reverse direction and returns, with a counter of the predetermined number of plays, to zero. Just as in the first described apparatus, the wheel carries numerals which correspond to the number of predetermined plays, beyond which there is a limitation; this numeral appears through the existing windows of cassettes, which permits controlling the reeling of the strip. The limitation of the partially notched wheel and which comprises a limitation abutment and/or a reset abutment, blocks the balancers and the feelers, and tension arises in the tape or film; a magnetoscope reader or other analogous apparatus can be used which comprises security apparatus which stops the reading apparatus by disengaging the operative parts at a certain tension in the length of film or tape.

The assembly of counting and limiting devices may be combined in the same cassette. In this case, a guard plate bears against the two axles of the two rolls of the spools and thence on the support columns. Said guard plate comprises, coaxially with one of the axles of a roll, the notched wheel which serves as counter, and coaxially with the other axle of the other roll, the partially notched wheel which bears a stop abutment and a reset abutment. The partially notched blocking wheel is actuated in the same way by a balancer, a cam, and a base on which are mounted feelers. The presence of these two feelers which utilize the thickness of the rolls of tape avoids any spring system.

According to another embodiment, still according to the invention, the counting and limiting apparatus of the cassette may be combined on two wheels, one counting wheel and one limiting wheel which are coaxially superposed; these two coaxial wheels may then be disposed coaxially with one or the other of the rolls. The guard plate is thus partially cut away, but the arrangement of cam, balancers, and feelers, remains identical and still utilizes the thickness of the two rolls.

Without departing from the scope of the invention, one can conceive a counting wheel and a limiting wheel which would utilize a mode of action analogous to the arrangement of cam, balancers, feelers, but using, as in French patent No. 2,296,907 at least one external return spring.

There are already patents which deal with counting the number of plays in a cassette. One of these is the above French patent No. 2,296,907. This patent describes counting apparatus which is disposed in a cassette especially provided to this end. It cannot use an existing cassette, because the cassette is substantially modified, and the feeler comprises a return spring. As state of the art may be cited two other patents: French patent No. 2,066,235 and French patent No. 2,129,050. The former describes a cassette which is disposed in a special reader provided to count the number of times the cassette is inserted in the reader. A counter is therefore not integrated in the cassette. The latter describes a feeler which electronically stops the cassette at the end of the strip.

The accompanying drawings, given by way of non-limiting example, will permit easy comprehension of the invention and show a preferred embodiment of the invention. In the drawings.

Referring now to the drawings in greater detail, it will be seen that on a column 1 is mounted a cam 2 whose displacement actuates an escapement in the form of a toothed rocking member or balancer 3. This balancer 3, mounted on an axle 4, causes to advance, by its ends 5 and 6 by half a step a toothed wheel 7 which serves to count the plays and causes to pass before the window 8 the numeral 9 corresponding to the number of completed plays.

Cam 2 is fixed to a base 10 which has two swinging members 11 and 12 which act as feelers and whose ends are provided with a roller or contacter 13 and 14.

These contact rollers 13 and 14 roll or slide on tape 15 which unrolls from roll A to roll B and vice versa.

These feelers move according to the thickness D of the rolls A and B, which is a function of the unrolling of tape 15 on spools $C_1$, $C_2$; during this movement, the members 11 and 12 move the base 10, and hence the cam 2, which thus acts on balancer 3 to turn by a half step the toothed wheel 7.

Figure 1:
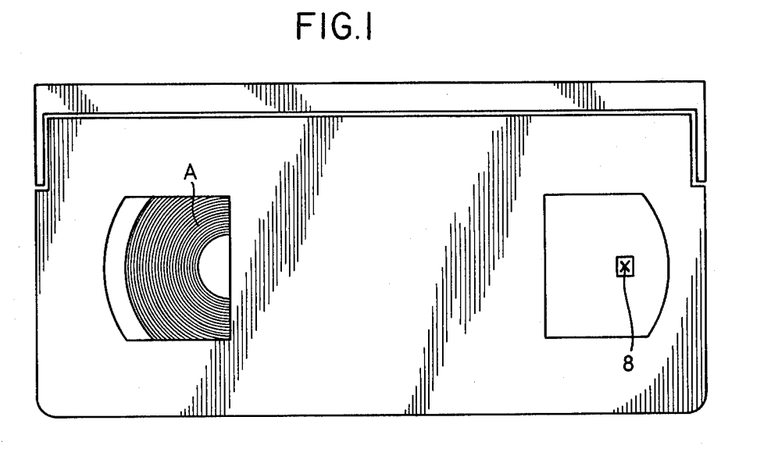
FIG. 1 is a plan view of the outside of the cassette with its window for counting the number of plays.
Figure 2:
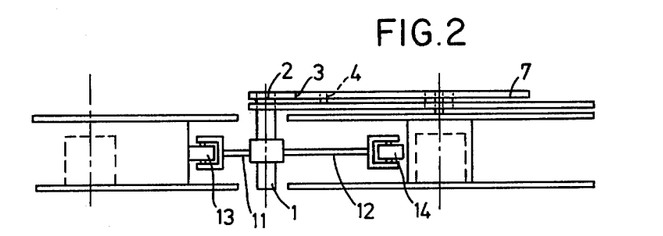
FIG. 2 is a schematic view, from the side, of the mechanism of the device.
Figure 3:
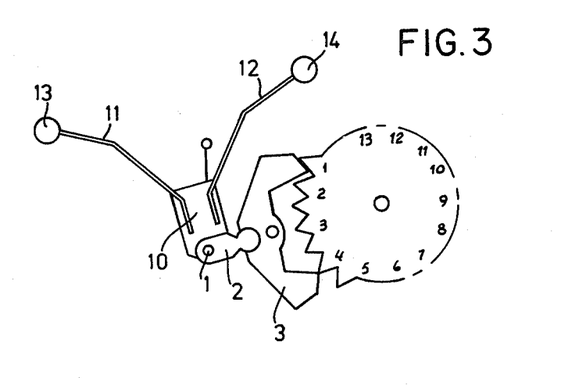
FIG. 3 is a schematic assembly view of the device, shown removed from the cassette.
Figure 4:
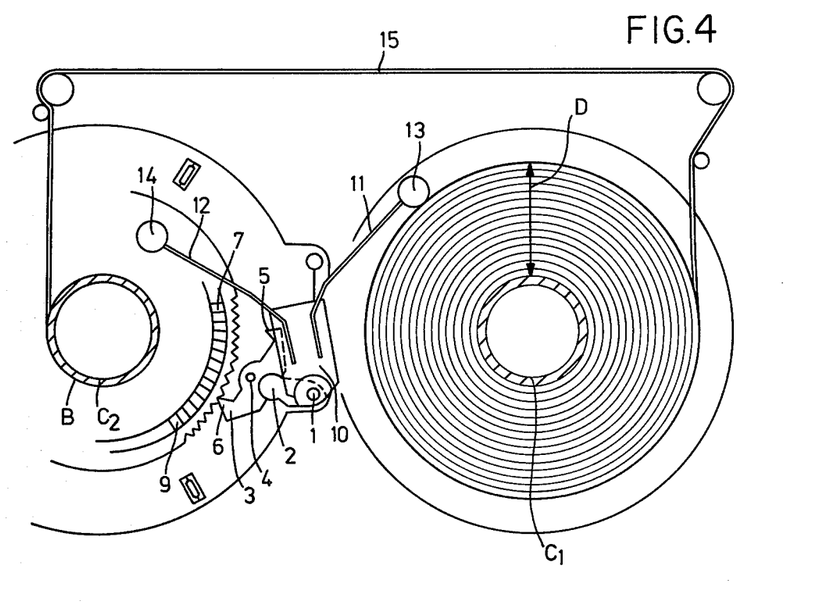
FIG. 4 is a view of the device according to the invention in place in a cassette, the right-hand roll of tape being at the beginning of its unwinding.

The mechanism operates as follows: When roll A is full, before the first play, the swinging member 11 is in its raised position, see FIG. 4. Little by little the tape 15 unrolls, and the roll A empties while the roll B fills. The thickness D of tape 15 of roll A decreases, and the swinging member descends to its lowermost position; while on roll B, the roller 14 and its swinging member are raised to the highest position. As a result, the cam 2 actuates the balancer which, by one of its end 5 or 6 causes wheel 7 to advance half a notch.

When the cassette is rewound in the other direction, the roll B of tap 15 unrolls and the roll A refills; at the end of the unrolling the balancer 3, by its end 5 or 6, makes the toothed wheel 7 advance by another half notch.

The proportion of the different members is so provided that as a function of the shape of the teeth of wheel 7, the different levers have sufficient force to turn said wheel.

Figure 5:
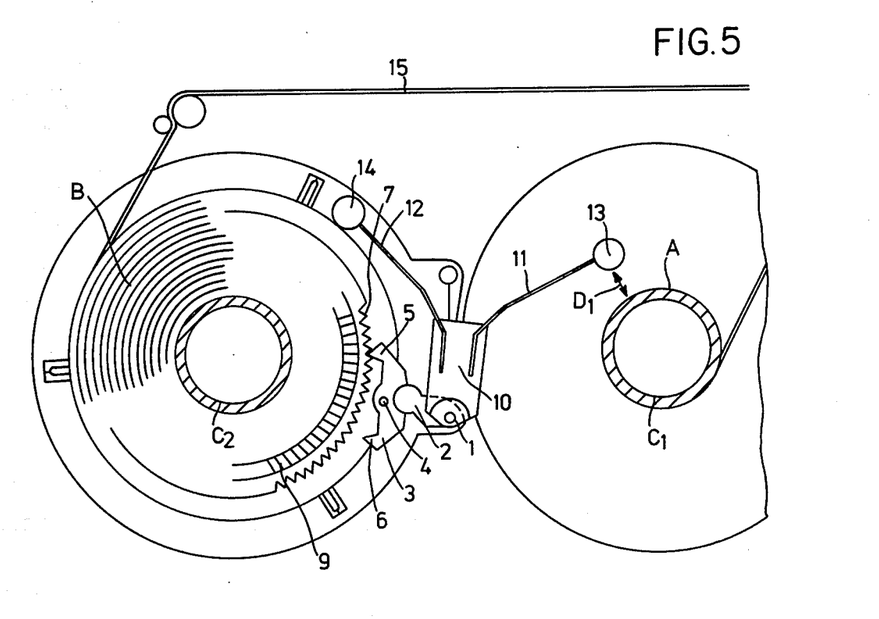
FIG. 5 is the same view as FIG. 4, but in which the roll has been completely unwound from the right-hand roll.
Figure 6:
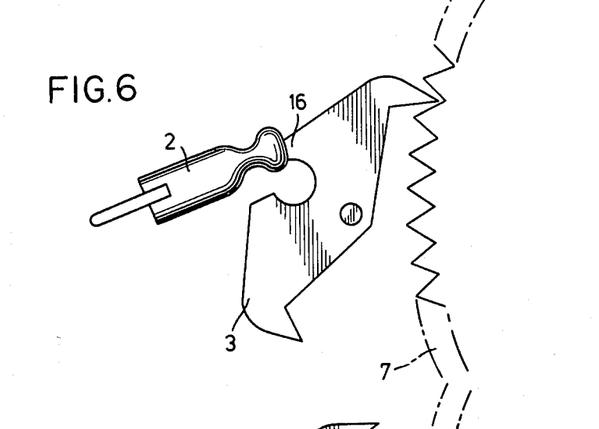
FIGS. 6, 7 and 8 show in detail the action of the cam on the balancer, said balancer having been modified so that the moment of advance is retarded by half a notch on the toothed wheel so as to prevent the fraud described above. The balancer has a special shape which comprises a recess permitting the escape of the cam at the end of the operation.
Figure 7:
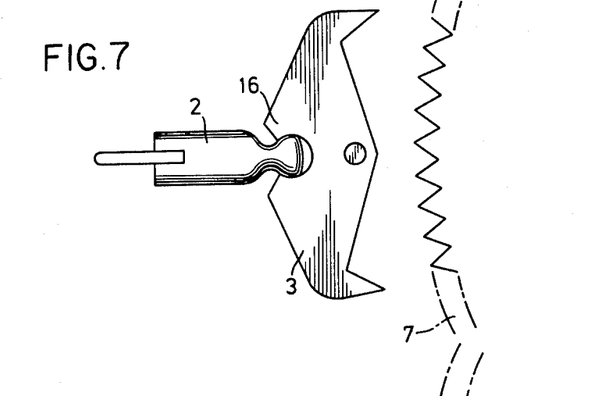
Figure 8:
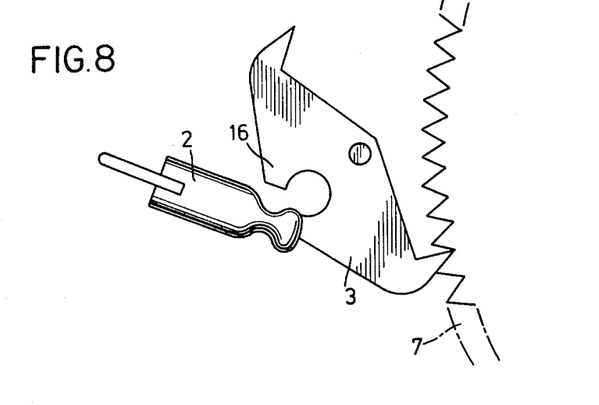

The angle between the swinging members is likewise a function of the diameter of the rolls, and of the spacing of said spools. Thus, at the end of unrolling one roll, the swinging member will not come into contact with the spool $C_1$, see FIG. 5. There will in fact remain a distance $D_1$ between the contacter 13 and the spool $C_1$.

To prevent a knowledgeable user from using a cassette while avoiding advance of the counter, by stopping the unrolling of the cassette a little before the end, it is proposed to modify 1/6th of the path at the beginning and at the end of the unrolling of the cassette. To this end, a special shape has been given at 16 to the recess of the balancer 3, this recess 16 permitting the escape of the cam 2 toward the end of operation.

Figure 9:
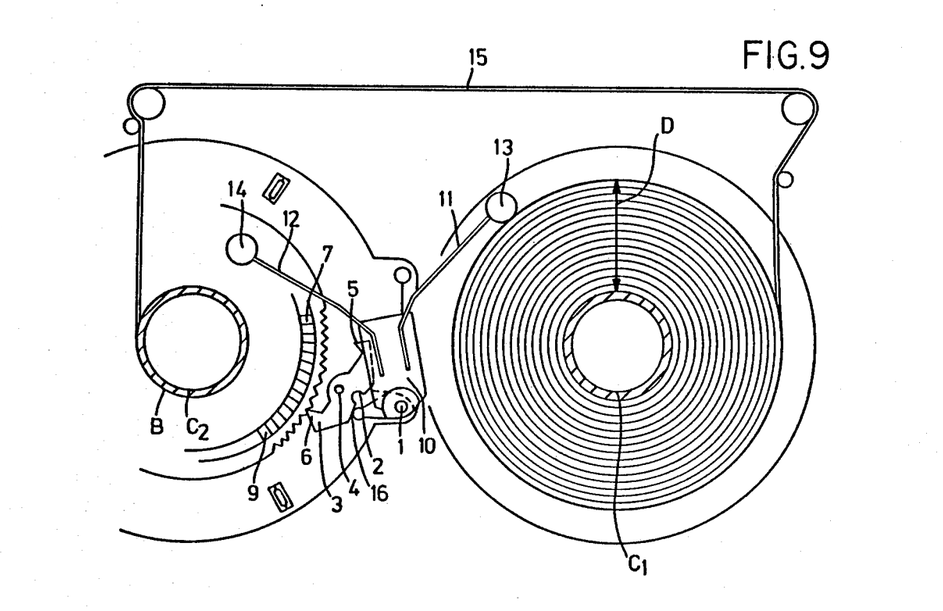
FIGS. 9 and 10 are plan views of the cassette with the balancer modified as shown in FIGS. 6, 7 and 8.
Figure 10:
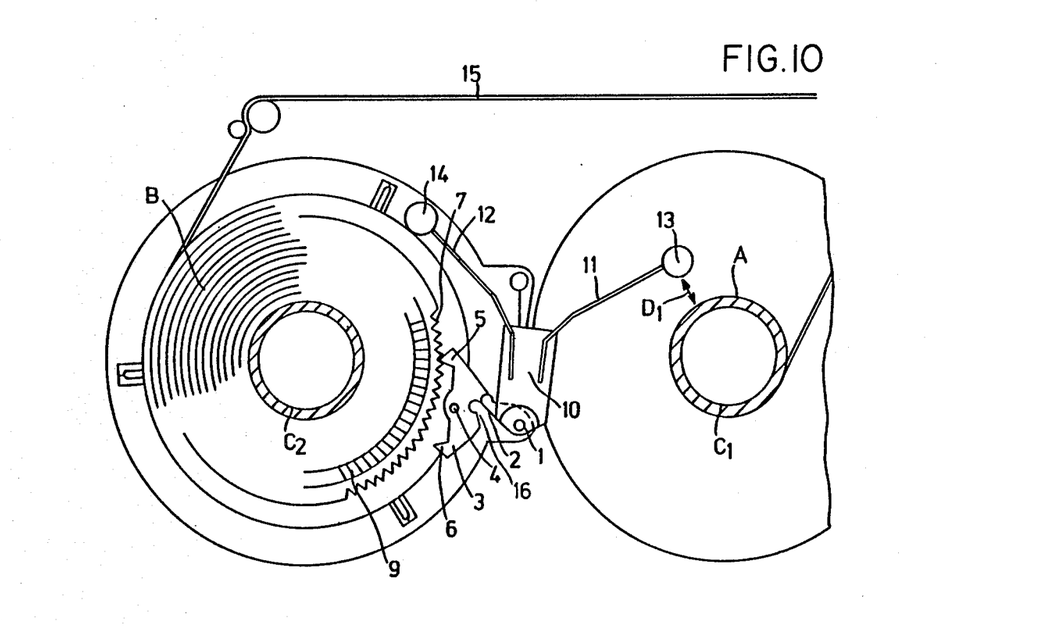

In FIGS. 9 and 10, it will be easily seen how the recess 16 of balancer 3 permits the escape of the cam 2.

Figure 11:
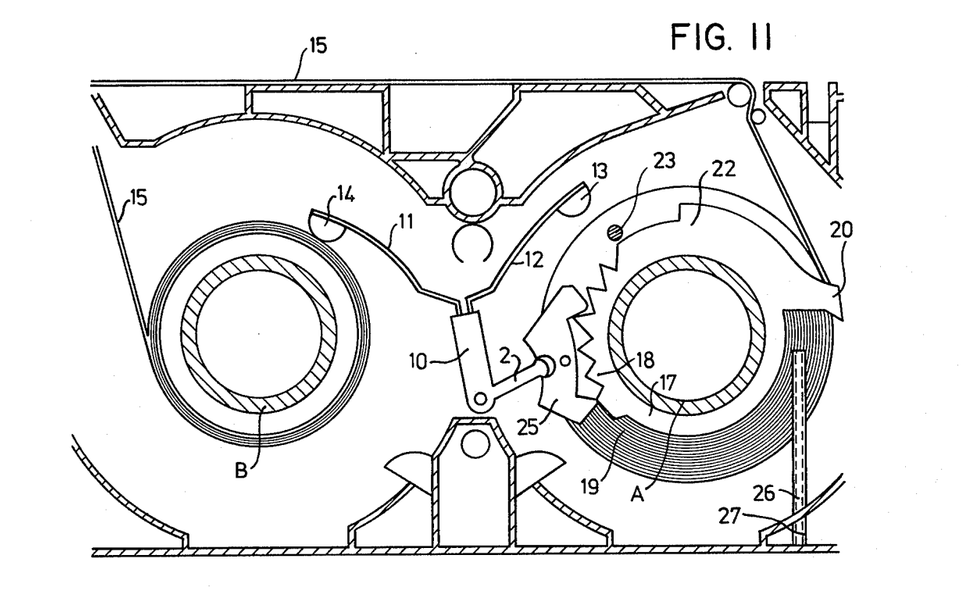
FIG. 11 is a view of the cassette seen in plan comprising a blocking wheel, said wheel being in the blocking position.
Figure 12:
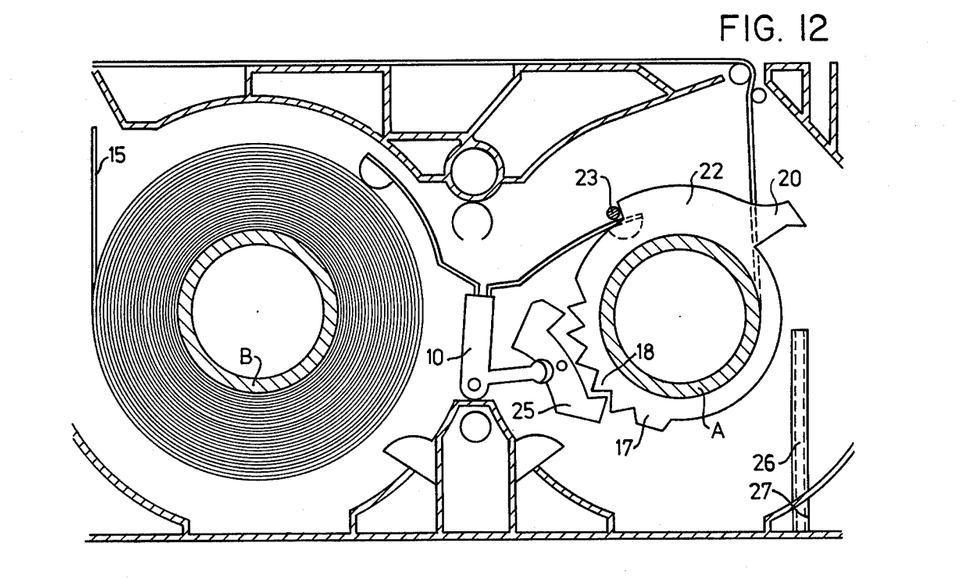
FIG. 12 is the same view as FIG. 11 but the blocking wheel is positioned for several more plays before blocking ensues.
Figure 13:
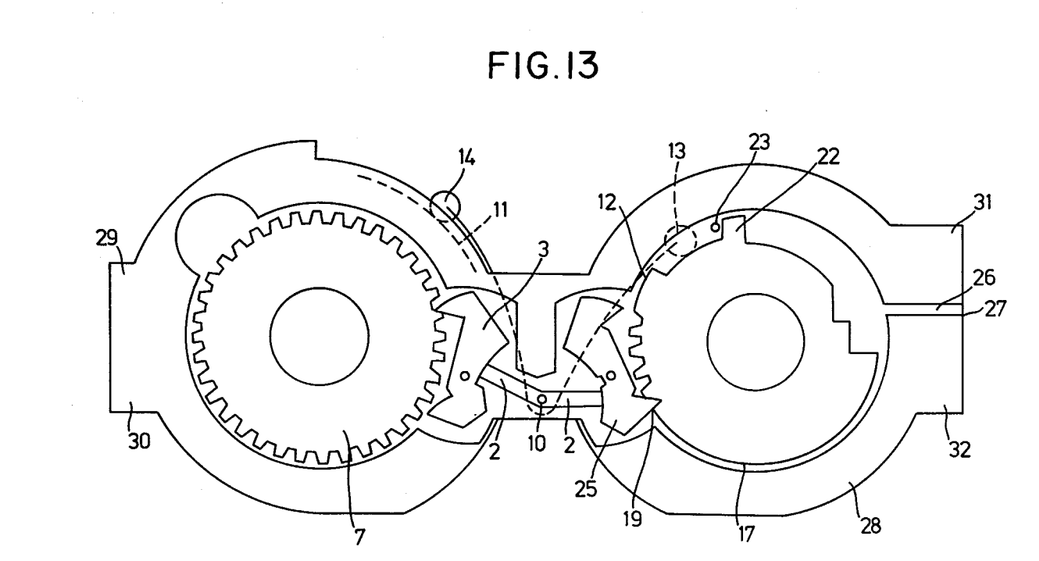
Figure 14:
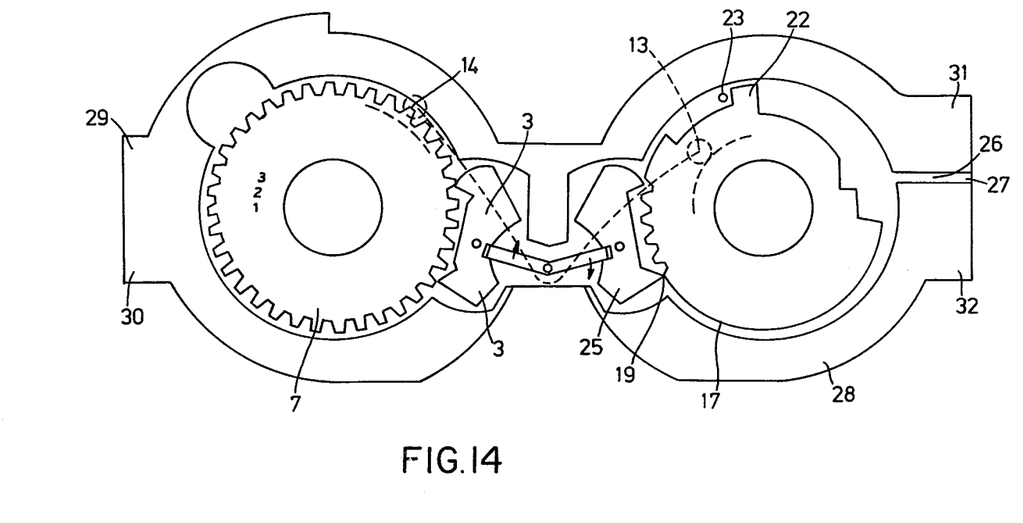
Figure 15:
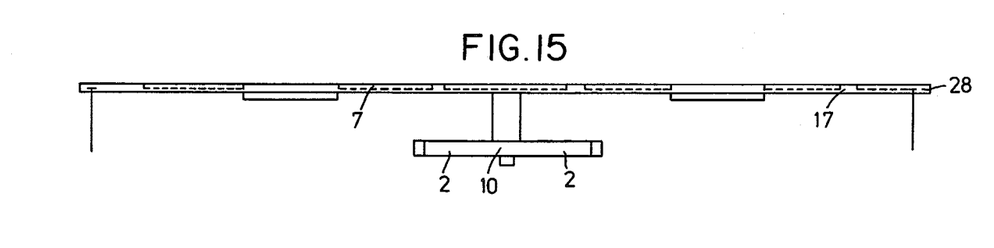

In FIGS. 11 and 12, it will be seen that the blocking device for the cassette is comprised by a wheel 17 which is partially notched at 18, and which has at least one blocking abutment 19 and a reset abutment 20. In these figures is shown another stopping and resetting abutment 22 which comes into contact against a stop and reset lug 23. As indicated above, this notched wheel 17 is actuated by mechanical means in the form of a feeler 11, 12, 13, 14 mounted on a base 10 which acts through a cam 2 on balancer 25. Access means 26, such as a tube, permit the operator by means of a key, such as a pin (not shown), to act on the reset abutment 20 and to return the wheel 17 to reset position for a predetermined number of plays.

In FIGS. 11 and 12, it will be seen that the renter, the manufacturer, the cassette vendor or the editor can introduce, through the tube 26, a rod (not shown) which permits him to actuate the reset abutment 20 and to turn the wheel 17 in the other direction. This wheel comes, by abutment 22, to rest against the lug 23, and one can thus reset as desired the cassette for X number of predetermined plays. Similarly, the access means such as a tube 26 may comprise, by means of its opening 27, a means permitting to block the access. This means may be mechanical or electronic.

What is claimed is:

1. In a cassette for a strip of tape or film, comprising a cover and inside the cover a pair of spools on which the strip is wound and unwound; the improvement comprising means for counting the number of times the cassette is played, comprising feeler means adapted to ride on and follow the periphery of at least one of said rolls, and means responsive to movement of the feeler means to register one play of the cassette, said feeler means being mounted on the cover for pivotal movement about an axis parallel to the axes of the spools, a toothed wheel, and a toothed rocking member actuated by the feeler means to swing toward and away from the toothed wheel into and out of engagement with the teeth of the toothed wheel thereby to turn the toothed wheel stepwise upon swinging movement of the feeler means, the position of the toothed wheel counting the number of plays of the cassette.

2. Apparatus as claimed in claim 1, and abutment means on the toothed wheel registrable with stop means on the cover to prevent turning of the wheel past a predetermined number of plays.

3. Apparatus as claimed in claim 1, and abutment means on the toothed wheel engageable with said toothed rocking member to limit the number of plays of the tape.

4. Apparatus as claimed in claim 1, said toothed wheel being coaxial with one of said spools.

5. Apparatus as claimed in claim 1, said feeler means comprising a feeler individual to each said roll, said feelers being mounted for conjoint swinging movement so that one feeler recedes from the axis of one roll at the same time that the other feeler approaches the axis of the other roll.

6. Apparatus as claimed in claim 1, and means to disengage said feeler means for said toothed rocking member toward the beginning and end of each play of the cassette, whereby said toothed rocking member moves to count the play only during an intermediate portion of the play of the cassette.

7. Apparatus as claimed in claim 1, said toothed rocking member having two teeth one disposed on each side of said axis of pivotal movement of the toothed rocking member, one of the latter said teeth engaging said toothed wheel toward the beginning of play of the cassette and the other tooth of the toothed rocking member engaging the toothed wheel toward the end of the play of the cassette.

* * * * *